Aug. 7, 1956  K. C. CUMMINGS  2,758,270
SHAFT POSITIONING APPARATUS
Filed April 17, 1953  3 Sheets-Sheet 1

INVENTOR.
KIMBALL C. CUMMINGS
BY George H Fisher
ATTORNEY

Aug. 7, 1956  K. C. CUMMINGS  2,758,270
SHAFT POSITIONING APPARATUS
Filed April 17, 1953  3 Sheets-Sheet 3

INVENTOR.
KIMBALL C. CUMMINGS
BY George H. Fisher
ATTORNEY

United States Patent Office 2,758,270
Patented Aug. 7, 1956

2,758,270

SHAFT POSITIONING APPARATUS

Kimball C. Cummings, Golden Valley, Minn., assignor to Minneapolis-Honeywell Regulator Company, Minneapolis, Minn., a corporation of Delaware Application April 17, 1953, Serial No. 349,500

6 Claims. (Cl. 318—467)

This invention pertains to apparatus for rotating a shaft to a predetermined angular position. Specifically, the invention is directed toward a method of controlling the energization of a motor that moves the shaft to the predetermined position.

In connection with a shaft which is rotatable about its longitudinal axis to a plurality of angular positions, one embodiment of the invention comprises a plurality of notched conductive discs operatively connected to said shaft, a plurality of contacting means positioned about said discs and adapted to engage said discs and to disengage said discs depending upon the angular position of the shaft, and shaft position selection means including means for energizing certain of said contacting means in accordance to a pre-selected shaft position, a motor for positioning said shaft, and a source of energization for said motor, said motor remaining energized until said energized contacting means disengage said discs, there being a combination of one of said contacting means disengaging said discs for each of said angular positions.

Prior art shaft positioning devices are known and generally comprise a system which requires at least one control wire for each desired position of the shaft. An object of the instant invention is to reduce a number of control wires to a number less than the total number of shaft positions.

A further object of this invention is to have, in a system wherein a shaft is to be rotated to a plurality of angular positions serially identified by successive whole numbers having two figures, first means associated with said shaft for positioning said shaft to the first numbered position of a group of numbered positions having the same first figure, said group of numbered positions including a pre-selected numbered position, and second means associated with said shaft for positioning said shaft to said pre-selected numbered position, said second means being effective to position said shaft to said pre-selected numbered position only when said first means has positioned said shaft to said first numbered position.

For a full understanding of the invention, and further appreciation of its features and advantages, reference is to be had to the following detailed description and accompanying drawings, and to the appended claims.

Figure 1:
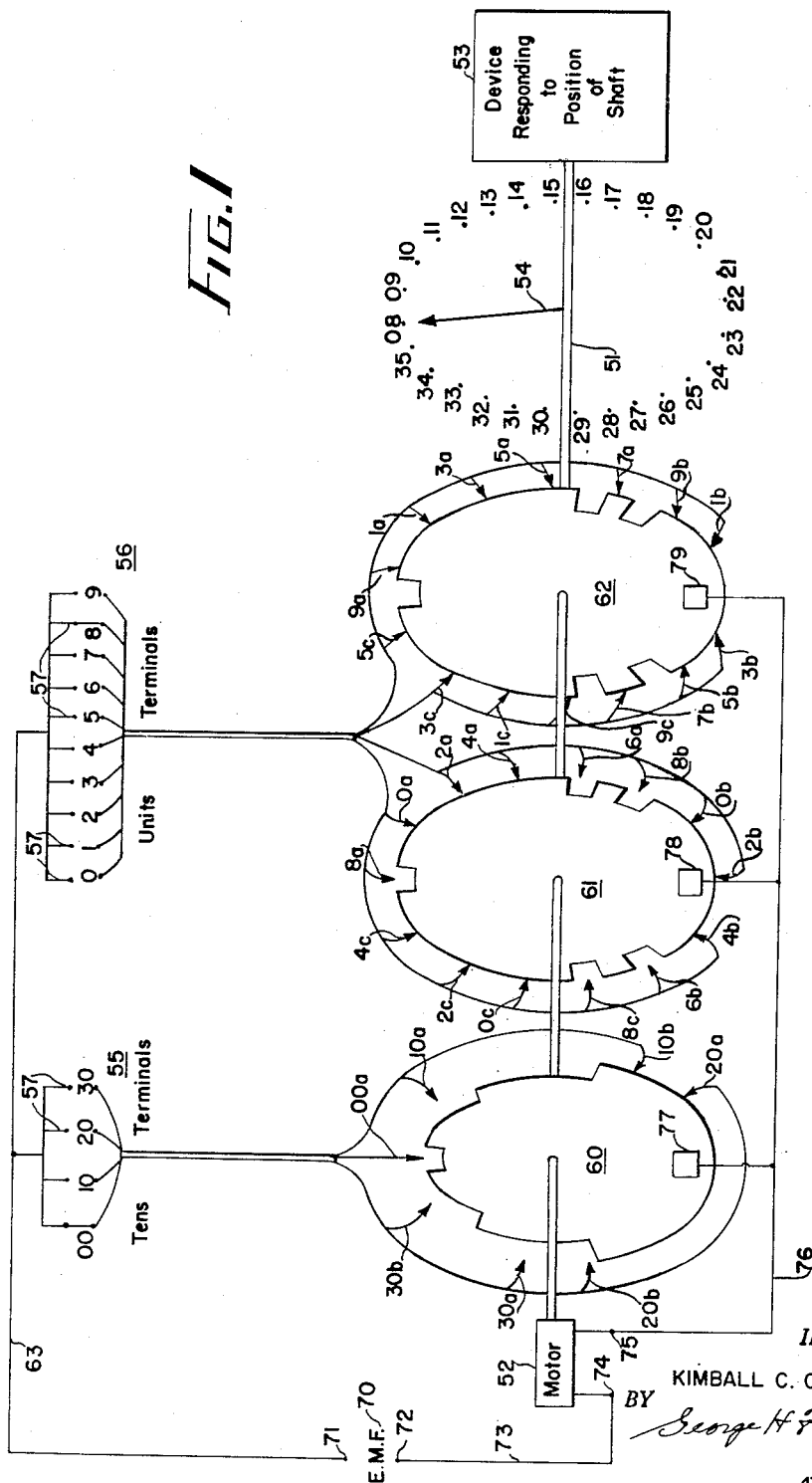
Figure 1 is a schematic representation of the general method used in the instant invention to position a shaft to a plurality of angular positions.

Referring now to Figure 1, a shaft 51 is adapted to be rotated to 28 angular positions numbered consecutively from 8 to 35 by a motor 52. A device 53 which responds to the position of shaft 51 is operatively connected to the shaft. The device 53 could have many embodiments, one example being a mechanism for tuning a piece of radio apparatus in one megacycle steps from a minimum frequency of 108 megacycles to a maximum frequency of 135 megacycles. A pointing device 54 connected to shaft 51 gives a visual indication of the angular position of the shaft. Operatively connected to shaft 51 are a plurality of notched conductive discs 60, 61, and 62. Positioned around the peripheries of the discs 60 to 62 are a plurality of stationary contacting means such as contacts or wipers. The wipers 00a, 10a, 10b, 20a, 20b, 30a, and 30b, associated with disc 60 are electrically connected by leads to a group of terminals 55, also identified as the "Tens terminals." The wiper 00a is connected to the the "00" terminal, the wipers 10a and 10b are connected to the "10" terminal, and so on. The wipers 8a, 0a, 2a, 4a, 6a, 8b, 0b, 2b, 4b, 6b, 8c, 0c, 2c, and 4c and the wipers 9a, 1a, 3a, 5a, 7a, 9b, 1b, 3b, 5b, 7b, 9c, 1c, 3c, and 5c, associated respectively with discs 61 and 62 are electrically connected by leads to a group of terminals 56 also identified as the "Units terminals." The wipers 8a, 8b, and 8c are connected to the "8" terminal of the "Units terminal" group, the wipers 9a, 9b, and 9c are connected to the "9" terminal, and so on. Each of the "Tens terminals" and the "Units terminals" is opposed by a complementary terminal 57. All of the complementary terminals 57 are at the same electrical potential and are connected by means of lead 63 to a first terminal 71 of a source of electromotive force 70. The other terminal 72 of the source of electromotive force 70 is connected by means of lead 73 to a first terminal 74 of the motor 52. The other terminal 75 of the motor 52 is connected by means of lead 76 to wipers 77, 78, 79 which are in continuous electrical engagement with the discs 60, 61, and 62 respectively. As indicated above, the peripheries of the discs are notched and the wipers connected to the "Tens terminals" and the "Units terminals" are positioned about the peripheries of the discs. The positioning of the wipers and the shapes of the notches on the discs is such that for certain positions of the shaft, some of the wipers will be electrically engaging the discs and some of the wipers will be electrically disengaging the discs. The wipers are so positioned and the notches are so arranged, however, so that for each position of the shaft, i. e., from 8 to 35, there will be at least one wiper disengaging one of the discs 61, 62 and at least one wiper disengaging disc 60.

Normally, motor 52 will be deenergized and shaft 51 will be positioned at one of its 28 positions. In Figure 1, the shaft 51 is shown in position 08. It should be noted that for this position, an electrical connection is completed between the "00" terminal in the "Tens terminal" group 55 and its complementary terminal 57 and an electrical connection is completed between the "8" terminal in the "Units terminal" group 56 and its complementary terminal 57. It should be further noted that for this position, the 00a wiper associated with disc 60 and electrically connected to the "00" terminal is electrically disengaged from disc 60 and also that wipers 8a, 8b, and 8c are electrically disengaged from disc 61. Should it be desired for the shaft 51 to assume a different position, for example, position 24, then means which are not shown because their details are not essential to the invention are employed to disconnect the "00" and the "8" terminal from their complementary terminals 57 and to connect the "20" terminal and the "4" terminal to their complementary terminals. Current would then flow from terminal 71 of the source of electromotive force 70 through lead 63, the complementary terminals 57, the "20" terminal and the "4" terminal, the connecting leads and the wipers 20a and 20b associated with the "20" terminal and the wipers 4a, 4b, and 4c and leads associated with the "4" terminal, the discs 60 and 61, wipers 77 and 78, lead 76, motor 52, and back to terminal 72 of the source of electromotive force 70. The aforedescribed circuit will result in the energization of the motor 52 which will commence to cause shaft 51 to rotate. Motor 52 is preferably of the "ratchet" type wherein unidirectional impulses of rotation or motion of its output shaft are obtained rather than continuous motion or rotation. In other words, motor 52 is selected so that its rotation is unidirectional and will advance shaft 51 one position at a time. As shown in Figure 1, motor 52 will cause discs 60–62 to rotate in a clockwise direction. Such motors are well known to those skilled in the art. Motor 52 will continue to operate, advancing shaft 51 one position at a time, until it is at position 24, pointer 54 giving a visual indication of the shaft position. At this point, the wipers 20a and 20b and the wipers 4a, 4b, and 4c which are energized by the current flowing through the "20" terminal and the "4" terminal respectively will be opposed by notches on the discs 60 and 61 and hence will disengage, in an electrical sense, the discs and thus interrupt the circuit energizing the motor 52. The shaft 51, will now remain in position 24 until some further position is called for.

Figure 2:
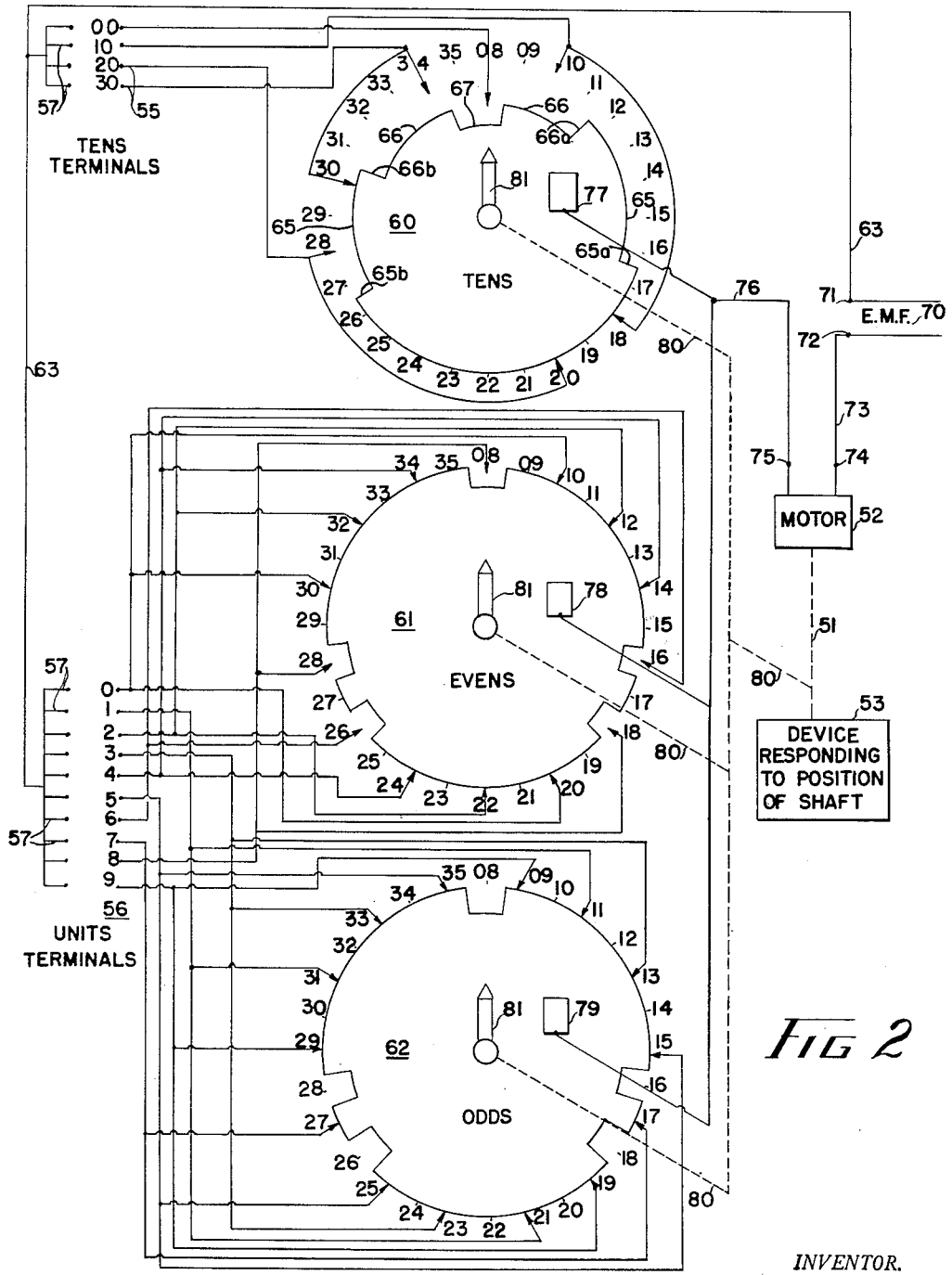
Figure 2 is a schematic representation of one embodiment of the invention.

For a more specific description of the apparatus shown in Figure 1, reference may now be had to Figure 2 wherein are shown discs 60, 61, and 62 in greater detail.

In Figure 2, as in Figure 1, shaft 51 is adapted to be rotated about its longitudinal axis to a plurality of angular positions by motor 52. A device 53 responding to the position of shaft 51 is connected to shaft 51 at a point removed from the motor 52. The conductive discs 60, 61, and 62 are operatively connected to shaft 51, this being indicated by dashed lines 80. Each of the conductive discs has a wiper continuously in engagement therewith, the wipers 77, 78, and 79 being connected to a terminal 75 of motor 52 by means of connection lead 76. The other terminal 74 of motor 52 is connected by means of lead 73 to one of the terminals 72 of a source of electromotive force 70. The other terminal 71 of the source of electromotive force 70 is connected by means of a lead 63 to a group of complementary terminals 57 for a group of "Units terminals" 56 and a group of "Tens terminals" 55. It is to be appreciated that each of the conductive discs 60, 61, and 62 is adapted to turn unitarily with shaft 51. In the position shown, the shaft 51 is in position 08. Should shaft 51 be caused to move to position 22, each of the conductive discs would be rotated 180°. Pointers 81 associated with the conductive discs 60, 61, and 62 give a visual indication of the position of the discs and the shaft 51.

As was indicated above, the particular embodiment of the invention shown is concerned with a shaft adapted to be positioned to any one of 28 positions. These positions are numbered consecutively from 08 to 35. It is to be noted that this particular selection of identifying digits causes the entire sequence of numbers to fall into four groups of numbers, each group being distinguished by having the same first figure. That is, numbers 08 and 09 are in the first group, numbers 10 to 19 are in the second group, numbers 20 to 29 are in the third group, and numbers 30 to 35 are in the fourth group. The teaching of the invention is to have a "Tens" terminal for each group of numbers having the same first figure. In other words, there is a "00" "Tens" terminal for those numbers between 00 and 09, in this case, merely numbers 08 and 09; there is a "10" "Tens" terminal for the numbers 10 to 19; a "20" "Tens" terminal for the numbers 20 to 29; and a "30" "Tens" terminal for the numbers in the thirties, in this case, numbers 30–35. Each of the terminals in the Tens terminal" group is connected to its respective wiper or wipers. In the case of the "00" terminal, a lead connects it to a wiper positioned at the 08 position. The "10" "Tens" terminal is connected by a lead to two wipers, one at position 10 and the other at position 18. Similarly the "20" terminal is connected by a lead to two wipers, one at position 20 and the other at position 28. Further, the "30" terminal is connected by a lead to two wipers, one at position 30 and the other at position 34. It is to be noted that the wipers associated with the "10" and the "20" "Tens" terminals are at an equal distance away from the center of the disc 60. The wipers associated with the "30" "Tens" terminal are at an equal distance away from the center of the disc 60 but at a distance less than that at which the "10" and "20" wipers are. The wiper at position 08, which is associated with the "00" terminal, is closer to the center of disc 60 than either the wipers associated with the "30" terminal or the wipers associated with the "10" and "20" terminals.

It is to be noted that disc 60 has a plurality of radial levels or notches 65, 66, and 67 therein. Notch 65 is at the same radial level as the wipers at positions 30 and 34 and notch 66 is at the same radial level as the wiper at position 08. The wipers at positions 10, 18, 20, and 28 are adapted to engage disc 60 along the outer or unnotched portion of its periphery. The configuration of disc 60 is empirically determined in order to satisfy the following conditions. The first notch 65 is cut into disc 60 with an angular width of sufficient extent so that its leading edge 65a is just one position ahead (clockwise) of the wiper at position 18 when pointer 81 is pointing at position 10 and so that its trailing edge 65b is just one position behind (counterclockwise) of the wiper at position 10 when pointer 81 is pointing at position 19. The second notch 66 is cut into disc 60 with an angular width of sufficient extent so that its leading edge 66a is just one position ahead (clockwise) of the wiper at position 34 when pointer 81 is pointing at position 30 and so that its trailing edge 66b is just one position behind (counterclockwise) of the wiper at position 30 when pointer 81 is pointing at position 35. The third notch has an angular width of sufficient extent so that the wiper at position 08 does not contact disc 60 when pointer 81 is pointing at position 08 and 09.

The purpose of the disc 60 or "Tens" disc is to provide the "rough" positioning of shaft 51 in accordance to a request for a change in position of shaft 51. For example, if it were desired to change the position of shaft 51 from position 08 to a new position, for example, position 33, the action of the "Tens" disc 60 would result in the shaft to be brought around to position 30, at which point the circuit energizing the motor 52 through disc 60 would be broken. The "Tens" disc 60, therefore, serves the purpose of causing the shaft to be positioned to the first numbered position of a group of numbered positions having the same first figure, said group of numbered positions including a pre-selected numbered position. In the above example, position 33 is requested and the "Tens" disc 60 resulted in the shaft to be brought around to position 30.

Discs 61 and 62 are the discs that satisfy the units function and are respectively identified as the "Evens" and the "Odds" discs. The "Units" discs 61 and 62 serve the purpose of positioning the shaft 51 to a specific pre-selected numbered position, only after the "Tens" disc 60 has positioned the shaft to the first numbered position of a group of numbered positions having the same first figure, said group including said pre-selected numbered position. A total of 14 wipers are positioned around each of discs 61 and 62. In the case of disc 61, wipers are positioned at points 08, 10, 12, 14, 16, 18, 20, 22, 24, 26, 28, 30, 32, and 34. In the case of disc 62, the "Odds" disc, wipers are positioned at 09, 11, 13, 15, 17, 19, 21, 23, 25, 27, 29, 31, 33, and 35. A plurality of connecting leads connect the "Units terminals" from 0 to 9 to the wipers associated with the "Evens" and "Odds" discs 61 and 62. Each "Unit terminal" is connected to those wipers which are at positions having a second figure the same as the "Unit terminal" in question. For example, leads connect the "0" unit terminal to the wipers at positions 10, 20, and 30 about disc 61, leads connect the "9" unit terminal with the wipers at positions 09, 19, and 29 about disc 62, and so on.

It is to be noted that in the position of the discs as shown, there is on each of discs 61 and 62 a notch opposite position 08. Notches are also present at points 18 and 28. Thus, if the "8" unit terminal were energized by virtue of a connection between it and its complementary terminal 57, no current would flow into disc 61 due to the fact that each of the "8" wipers, that is, 08, 18, and 28 are opposed by notches on the periphery of the disc 61 and thus effectively electrically disengage said disc. It is to be noted that notches are also present on discs 61 and 62 adjacent positions 16 and 26. The purpose of these last named notches is to allow the motor to be deenergized when the shaft is at positions 18 and 28 respectively and the "08" terminal is energized. To explain, if the shaft were on position 18, the portion of the periphery of disc 61 that now is adjacent position 26 would be adjacent the wiper at position 08. Thus if no notch were present, current would flow from wiper 08 into the disc and result in additional energization of the motor 52. Similarly, when the shaft is in position 28, the portion of the periphery of disc 61 shown in Figure 2 adjacent wiper 16 would be adjacent to wiper 08 and should no notch be at that point, current would flow from the wiper 08 into the disc and thence to the motor 52 resulting in additional rotation of shaft 51. The notches at points 16 and 26 as shown in Figure 2 therefore are important to the operation of the device and may be calculated in the following manner. First, it is to be recognized that in a shaft to be positioned to 28 positions, there are two full sequences of ten numbers and one sequence of eight numbers. That is, a first sequence from 08 to 17 and a second sequence from 18 to point 27 with a partial third sequence of from point 28 to point 35. Thus each of the full sequences has ten numbers while the partial sequence has only eight. The relationship between the size of the full sequence and the size of the partial sequence is the key to the positioning of the auxiliary slots at point 16 and point 26. To determine the location of the auxiliary slots, merely begin at the basic slots, i. e., points 08, 18 and 28 and count ahead a number of positions equal to the number of numbers in the partial sequence, in this case eight, and cut a notch in the disc at that point. In the embodiment shown in Figure 2, this results in counting eight positions ahead of point 08 which brings one to point 16. Eight positions ahead of point 18 brings one to position 26. Counting eight positions ahead of point 28 of course brings one back to point 08 where there already is a notch. Using this method, discs can be designed for shaft positioning apparatus of any given number of shaft positions.

The operation of the apparatus shown in Figure 2 is analogous to that in Figure 1. For example, if it were desired to change the position of the shaft from the position 08, in which it is shown to a new position, for example, 35, the following would occur. In accordance to the pre-selection of position 35, the "30" terminal in the "Tens terminals" group and the "5" terminal in the "Units terminals" group would become energized by virtue of a circuit being established from their respective complementary terminals 57. As pointed out before, the method by which this establishing of energization to these terminals is not a part of the invention and need not be discussed further. By virtue of the energization of the "30" terminal and the "5" terminal, current will flow from terminal 71 of the source of electromotive force 70 through lead 63, complementary terminals 57, the "30" terminal, the wiper at position 30, disc 60, wiper 77, lead 76, motor 52, and lead 73 to terminal 72 of the source of electromotive force 70. At the same time current will flow through lead 63, complementary terminals 57, the "5" terminal of the "Units terminal" group and the wipers associated with disc 62 at positions 15, 25, and 35. Motor 52, therefore, has several paths by which it may be energized and consequently commences to advance shaft 51 in a direction represented by clockwise rotation of the discs 60—62 as shown in Figure 2. One or both of the wipers associated with disc 60 at points 30 and 34 will remain in electrical engagement with disc 60 until shaft 51 advances to position 30. At that point the circuit energizing motor 52 which included disc 60 will be opened and the motor will not remain energized by virtue of that circuit. However, motor 52 remains energized by virtue of the fact of the current flowing through the "5" terminal in the "Units terminal" group into disc 62 through the wipers at positions 15, 25, and 35. Motor 52 will thus remain energized and continue to advance shaft 51 until it reaches position 35 at which time each of the wipers at positions 15, 25, and 35 will be opposed by a notch on disc 62. Thus the last remaining circuits for the energization of motor 52 have been broken and the motor will stop rotating shaft 51.

Figure 3:
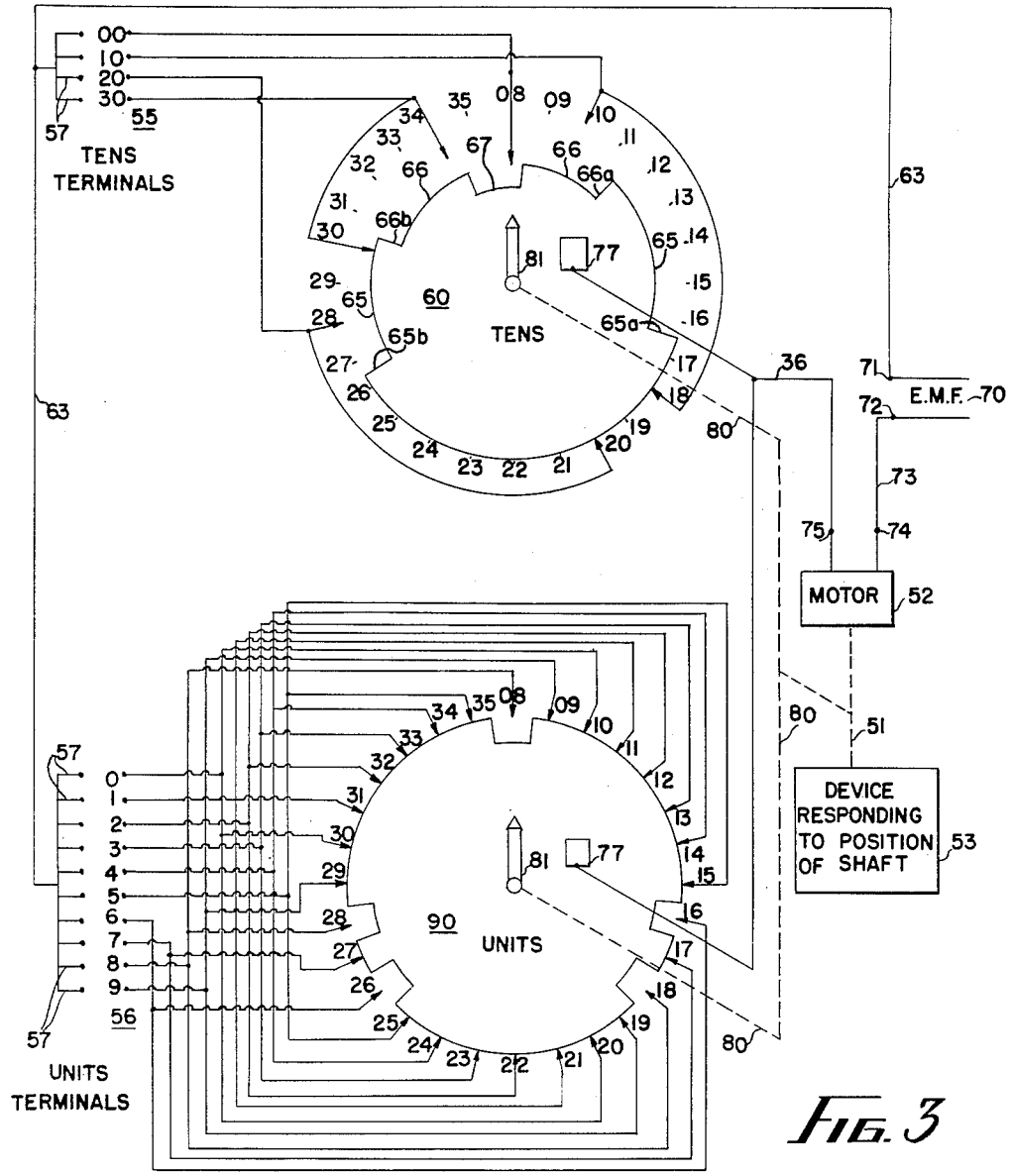
Figure 3 is a schematic representation of a second embodiment of the invention.

Figure 3 shows a further embodiment of the invention and is analogous in operation to the control circuit of Figure 2 but differs from the apparatus shown in Figure 2 in that it has a "Tens" disc 60 and a single "Units" disc 90. By having all of the units terminals associated with wipers surrounding the periphery of one disc, i. e., disc 90, the apparatus shown in Figure 3 eliminates the need for an extra disc. However, by having all of the unit wipers associated with one units disc, it is necessary to double the number of wipers adjacent the periphery of the disc over what is necessary in the embodiment shown in Figure 2. In some applications, it has been found difficult to place all of the wipers around one disc and hence the use of two discs for the units has been found advantageous. The principle of operation of the apparatus shown in Figure 3 is the same as the apparatus shown in Figure 2 and consequently will not be further explained.

While I have shown and described a specific embodiment of this invention, further modifications and improvements will occur to those skilled in the art. I desire it to be understood, therefore, that this invention is not limited to the particular form shown and I intend in the appended claims to cover all modifications which do not depart from the spirit and scope of the invention.

What I claim is:

1. Apparatus of the class described comprising a shaft rotatable about its longitudinal axis to any selected one of a plurality of angular positions serially identified by successive whole numbers having two figures such as 08, 18, 28; motor means adapted when energized to rotate said shaft; shaft position determining means comprising at least two tens terminals, one tens terminal for each group of said numbers having the same first figure, a plurality of units terminals, a plurality of electrically conductive discs mounted for rotation unitarily with said shaft, each of said discs including peripheral notches, contacting means positioned peripherally about said discs for normally engaging said discs and for disengaging said discs when said notches are aligned with said contacting means, means electrically connecting said tens terminals to those of said contacting means associated with one of said discs, and means electrically connecting said units terminals to those of said contacting means not associated with said one of said discs, terminal means adapted to be electrically energized; and means including additional connection means selectively energizing said motor from said last named terminal means through a selected one of said tens terminals and through a selected one of said unit terminals, said means connecting said units terminals and said tens terminals to said contacting means, said contacting means, and said discs, so that said motor is energized and rotates said shaft until the contacting means connected with said one of said tens terminals and said one of said units terminals are aligned with notches on said discs, said selected one of said tens terminals being determined by the first figure of any selected one of said numbers and said selected one of said units terminals being determined by the second figure of said selected one of said numbers.

2. Apparatus of the class described comprising a shaft rotatable about its longitudinal axis to any selected one of a plurality of angular positions serially identified by successive whole numbers having two figures such as 08, 18, 28; motor means adapted when energized to rotate said shaft; shaft position determining means comprising at least two tens terminals, one tens terminal for each group of said numbers having the same first figure, a plurality of units terminals, two electrically conductive discs mounted for rotation unitarily with said shaft, each of said discs including peripheral notches, contacting means positioned peripherally about said discs for normally engaging said discs and for disengaging said discs when said notches are aligned with said contacting means, means electrically connecting said tens terminals to those of said contacting means associated with one of said discs, and means electrically connecting said units terminals to those of said contacting means associated with the other of said discs, terminal means adapted to be electrically energized; and means including additional connection means selectively energizing said motor from said last named terminal means through a selected one of said tens terminals and through a selected one of said unit terminals, said means connecting said units terminals and said tens terminals to said contacting means, said contacting means, and said discs, so that said motor is energized and rotates said shaft until the contacting means connected with said one of said tens terminals and said one of said units terminals are aligned with notches on said discs, said selected one of said tens terminals being determined by the first figure of any selected one of said numbers and said selected one of said units terminals being determined by the second figure of said selected one of said numbers.

3. Apparatus of the class described comprising a shaft rotatable about its longitudinal axis to any selected one of a plurality of angular positions serially identified by successive whole numbers having two figures such as 08, 18, 28; motor means adapted when energized to rotate said shaft; shaft position determining means comprising at least two tens terminals, one tens terminal for each group of said numbers having the same first figure, a plurality of units terminals, three electrically conductive discs mounted for rotation unitarily with said shaft, each of said discs including peripheral notches, contacting means positioned peripherally about said discs for normally engaging said discs and for disengaging said discs when said notches are aligned with said contacting means, means electrically connecting said tens terminals to those of said contacting means associated with one of said discs, and means electrically connecting said units terminals to those of said contacting means associated with the other of said discs, terminal means adapted to be electrically energized; and means including additional connection means selectively energizing said motor from said last named terminal means through a selected one of said tens terminals and through a selected one of said unit terminals, said means connecting said units terminals and said tens terminals to said contacting means, said contacting means, and said discs, so that said motor is energized and rotates said shaft until the contacting means connected with said one of said tens terminals and said one of said units terminals are aligned with notches on said discs, said selected one of said tens terminals being determined by the first figure of any selected one of said numbers and said selected one of said units terminals being determined by the second figure of said selected one of said numbers.

4. Apparatus of the class described comprising a shaft rotatable about its longitudinal axis to any selected one of twenty-eight angular positions serially identified by successive whole numbers having two figures such as 08, 18, 28; motor means adapted when energized to rotate said shaft; shaft position determining means comprising at least three tens terminals, one tens terminal for each group of said numbers having the same first figure; ten units terminals, a plurality of electrically conductive discs mounted for rotation unitarily with said shaft, each of said discs including peripheral notches, contacting means positioned peripherally about said discs for normally engaging said discs and for disengaging said discs when said notches are aligned with said contacting means, means electrically connecting said tens terminals to those of said contacting means associated with one of said discs, and means electrically connecting said units terminals to those of said contacting means not associated with said one of said discs, terminal means adapted to be electrically energized; and means including additional connection means selectively energizing said motor from said last named terminal means through a selected one of said tens terminals and through a selected one of said unit terminals, said means connecting said units terminals and said tens terminals to said contacting means, said contacting means, and said discs, so that said motor is energized and rotates said shaft until the contacting means connected with said one of said tens terminals and said one of said units terminals are aligned with notches on said discs, said selected one of said tens terminals being determined by the first figure of any selected one of said numbers and said selected one of said units terminals being determined by the second figure of said selected one of said numbers.

5. Apparatus of the class described comprising a shaft adapted to be rotated about its longitudinal axis to any selected one of a plurality of angular positions serially identified by successive whole numbers having two figures such as 08, 18, 28; motor means adapted when energized to rotate said shaft; shaft position determining means comprising at least two tens terminals, on tens terminal for each group of said numbers having the same first figure, a plurality of units terminals, a plurality of electrically conductive discs mounted for rotation unitarily with said shaft, each of said discs including peripheral notches in predetermined relative angular positions, contacting means positioned peripherally about said discs in predetermined angular positions for normally engaging said discs and for disengaging said discs when said notches are aligned with said contacting means, means electrically connecting said tens terminals to those of said contacting means associated with one of said discs, and means electrically connecting said units terminals to those of said contacting means not associated with said one of said discs, terminal means adapted to be electrically energized; and means including additional connection means selectively energizing said motor from said terminal means through one of said tens terminals and one of said unit terminals, said means connecting said units terminals and said tens terminals to said contacting means, said contacting means, and said discs, so that said motor is energized and rotates said shaft until the contacting means connected with said one of said tens terminals and said one of said units terminals are aligned with notches on said discs.

6. Apparatus of the class described comprising a shaft adapted to be rotated about its longitudinal axis to any one of a plurality of angular positions serially identified by successive whole numbers having two figures such as 08, 18, 28; motor means adapted to cause said shaft to rotate to said positions; and shaft positioning apparatus comprising a plurality of members operatively connected to said shaft so as to rotate unitarily therewith, said members having peripheries, said peripheries having conductive portions and non-conducting portions, said portions being arranged at predetermined angular positions about said peripheries, stationary contacting means arranged about said peripheries of said members at predetermined angular positions and adapted to engage said portions, said non-conducting portions and said contacting means being positioned so that for each one of said positions of said shaft there is one of said non-conductive portions adjacent one of said contacting means, means for selecting one of said positions, means responsive to said last named means for energizing at least one of said contacting means, and connection means energizing said motor means when said one of said contacting means is contacting said conducting portions.

References Cited in the file of this patent

UNITED STATES PATENTS

| | | | |
|---|---|---|---|
| 2,406,848 | Novak | Sept. 3, | 1946 |
| 2,436,172 | Kent | Feb. 17, | 1948 |
| 2,467,422 | Bruene | Apr. 19, | 1949 |
| 2,471,843 | Stamper | May 31, | 1949 |
| 2,474,576 | Fedotoff | June 28, | 1949 |
| 2,553,069 | Unk et al. | May 15, | 1951 |
| 2,662,998 | Witters | Dec. 15, | 1953 |